United States Patent
Kou et al.

(10) Patent No.: US 8,281,224 B1
(45) Date of Patent: Oct. 2, 2012

(54) PROGRAMMABLE LBA AND DUMMY BIT RELIABILITIES

(75) Inventors: Yu Kou, San Jose, CA (US); Lingqi Zeng, San Jose, CA (US); Kin Man Ng, Cupertino, CA (US); Kwok W. Yeung, Milpitas, CA (US)

(73) Assignee: Link_A_Media Devices Corporation, Santa Clara, CA (US)

( * ) Notice: Subject to any disclaimer, the term of this patent is extended or adjusted under 35 U.S.C. 154(b) by 634 days.

(21) Appl. No.: 12/460,897

(22) Filed: Jul. 24, 2009

Related U.S. Application Data (60) Provisional application No. 61/196,635, filed on Oct. 20, 2008.

(51) Int. Cl.
*G11B 20/18* (2006.01)

(52) U.S. Cl. ........................................ 714/768; 714/780
(58) Field of Classification Search .................. 714/768, 714/780
See application file for complete search history.

(56) References Cited

U.S. PATENT DOCUMENTS

| | | | | |
|---|---|---|---|---|
| 5,600,662 | A * | 2/1997 | Zook | 714/769 |
| 5,828,676 | A * | 10/1998 | Hurlbut et al. | 714/752 |
| 6,345,074 | B1 * | 2/2002 | Turk et al. | 375/341 |
| 6,751,757 | B2 * | 6/2004 | Biskup et al. | 714/54 |
| 7,178,086 | B2 * | 2/2007 | Hassner et al. | 714/758 |
| 7,974,369 | B2 * | 7/2011 | Liu et al. | 375/341 |
| 2008/0276156 | A1 | 11/2008 | Gunnam et al. | |
| 2008/0301521 | A1 | 12/2008 | Gunnam et al. | |
| 2011/0131467 | A1 * | 6/2011 | Weathers | 714/758 |

* cited by examiner

*Primary Examiner* — Stephen M Baker
(74) *Attorney, Agent, or Firm* — Van Pelt, Yi & James LLP (57) ABSTRACT

Data is processed by obtaining data and redundant information from an expected position in a channel. Soft position information associated with the data is obtained and error correction decoding is performed using the data, the redundant information, and the soft position information to obtain a decoded position and decoded data. It is determined if the decoded position matches the expected position and the decoded data is output in the event the decoded position matches the expected position.

19 Claims, 11 Drawing Sheets

| Position X (hard) | 1 | 0 | 0 | 1 |
| --- | --- | --- | --- | --- |
| Position X (soft) | α | -α | -α | α |

← 502

| Position X (hard) | 1 | 0 | 0 | 1 |
| --- | --- | --- | --- | --- |
| Position X (soft) | $\alpha_3$ | $-\alpha_2$ | $-\alpha_1$ | $\alpha_0$ |

PROGRAMMABLE LBA AND DUMMY BIT RELIABILITIES

CROSS REFERENCE TO OTHER APPLICATIONS

This application claims priority to U.S. Provisional Patent Application No. 61/196,635 entitled PROGRAMMABLE LBA AND DUMMY BIT RELIABILITIES filed Oct. 20, 2008 which is incorporated herein by reference for all purposes.

BACKGROUND OF THE INVENTION

In storage systems, error correcting codes (ECC) are used to ensure user data can be written to and read back from a noisy channel by adding redundancy to user data. When error correction encoded data is obtained from the channel (e.g., by reading back from storage), the information is decoded and one of three results can occur: corrected, uncorrected, or miscorrected. The table below describes the three states corresponding to these results:

|  | Decoder was able to successfully decode encoded information | Decoder was unable to successfully decode encoded information |
| --- | --- | --- |
| Decoded data is desired data | Corrected | Uncorrected |
| Decoded data is not desired data | Miscorrected | |

An uncorrected result in some applications is acceptable since the data can be re-read and re-processed until corrected data is returned. A miscorrected result is undesirable because the decoded data is not the desired data, but it successfully passes the ECC detection criterion. That is, the system thinks it has decoded the data properly, but the returned data is not what is expected or was requested. In some cases, miscorrected data can crash a computer system. It would be desirable to develop techniques that address the miscorrected scenario.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
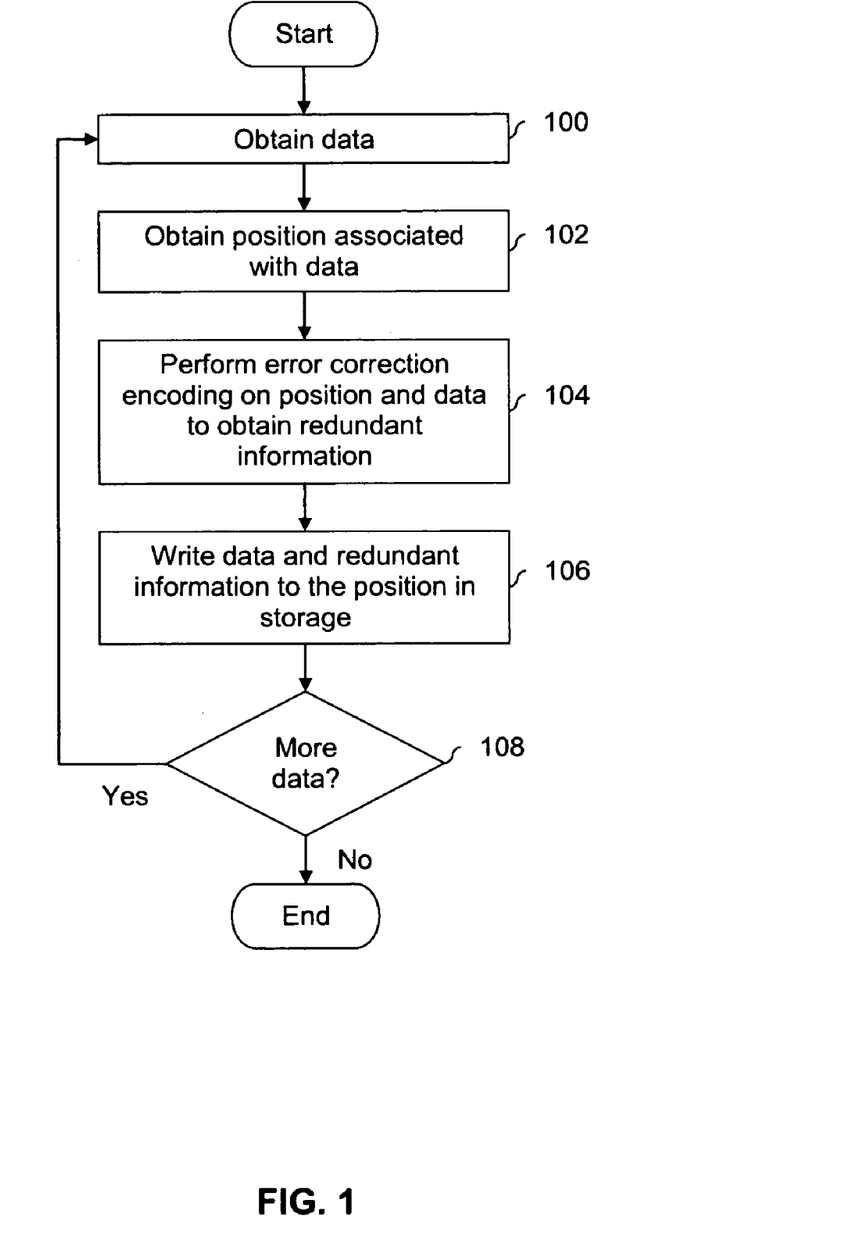
FIG. 1 is a flowchart illustrating an example of a write process.

FIG. 1 is a flowchart illustrating an example of a write process. At 100, data is obtained. At 102, a position associated with the data is obtained. For example, the position is where the data (and related information such as any redundant information) will be stored. In some embodiments, the size of the data (and any related information) is passed to a write controller, and the write controller returns a position or location that it will be written to.

At 104, error correction encoding is performed on the position and the data to obtain redundant information. The data and redundant information are written to the position in storage at 106. In this example, the position obtained at 102 is not written to storage. It is determined at 108 if there is more data. If so, the data is obtained at 100.

What is disclosed herein are techniques for processing data which is read from storage (e.g., processed and written to storage as described in FIG. 1). Soft position information is used during error correction decoding. The following figure shows one embodiment.

Figure 2:
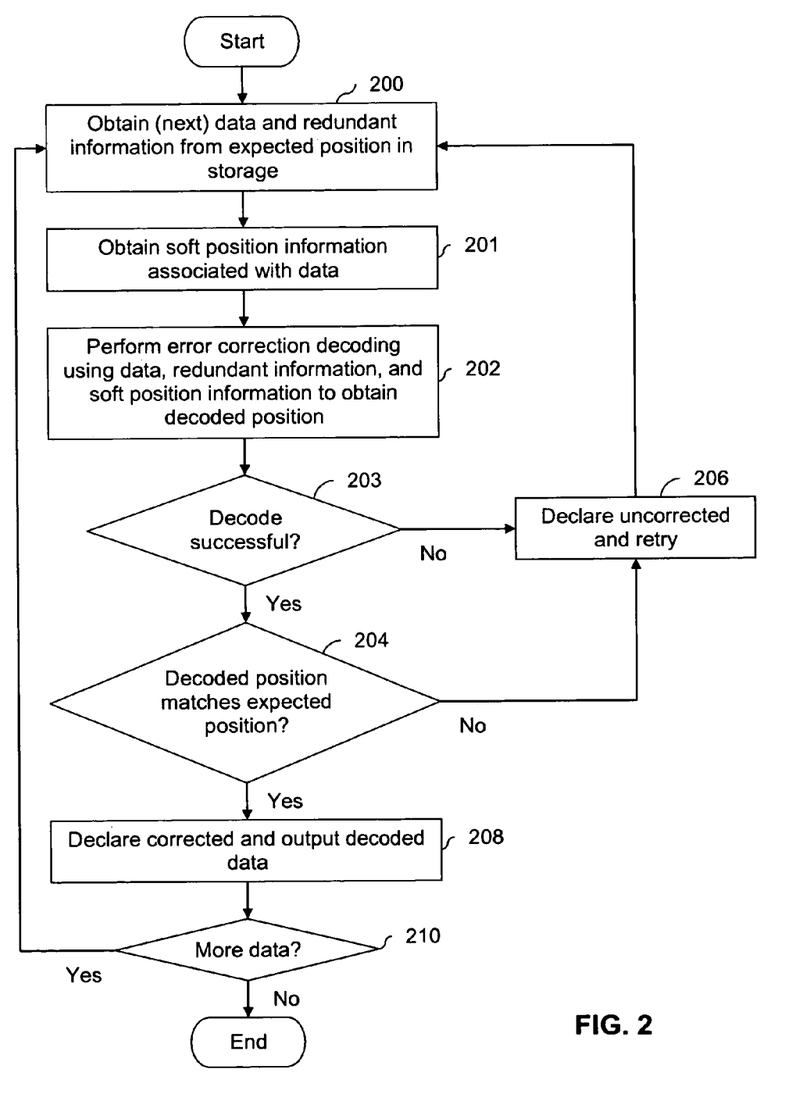
FIG. 2 is a flowchart illustrating an embodiment of a read process.
Figure 3:
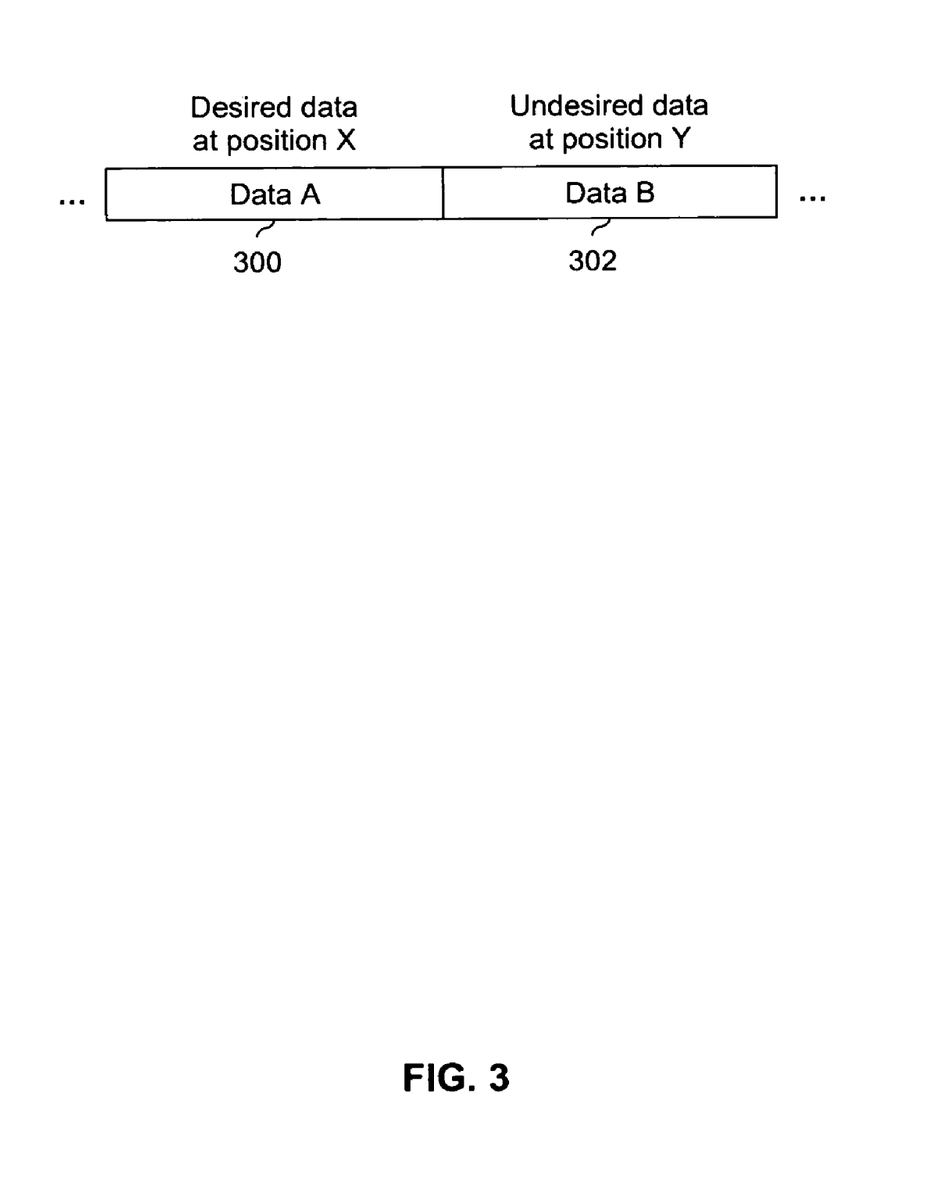
FIG. 3 is a diagram showing an embodiment of adjacent sectors in storage.

FIG. 2 is a flowchart illustrating an embodiment of a read process. In the example shown, read processing is shown, and in some embodiments FIG. 1 is a corresponding write process. FIG. 3 is a diagram showing an embodiment of adjacent sectors in storage. Some steps of FIG. 2 are explained below using FIG. 3 as an example.

At 200, data and redundant information are obtained from an expected position in storage. For example, in FIG. 3, data A (300) at position X is the desired or requested data. At 201, soft position information associated with the data is obtained. For example, a soft representation of the position X is obtained.

In various embodiments, the position comprises a variety of things. In one example, the position is a logical block address (LBA). An LBA is a commonly used value that specifies the location of blocks of data stored on storage devices and can be the address or the block to which it refers. In some embodiments, the position used is a portion of the LBA. For example, if the LBA is 0x53F (in hexadecimal) then in one embodiment the last four bits are used (i.e., F). This may reduce the amount of information used and/or stored, and four bits (at least in this example) of position information may be sufficient to detect when the system returns a sector that is not the desired sector. In some other embodiments, the position is an offset, e.g., from the top or beginning of a page or a wedge. In some embodiments, the position includes the track number and/or sector number (and/or some portion(s) thereof) on a disk. For example, a system may erroneously return a sector from an adjacent track, and by including track information in the position this can be detected. As shown in this example, in some embodiments the position includes information from two or more dimensions (e.g., (track, sector), (x, y) in Cartesian, or (r, θ) in polar).

Error correction decoding is performed using the data, redundant information, and soft position information to obtain a decoded position at 202. Some examples of error correction codes or decoders used at 202 that are capable of handling soft information or likelihoods include (but are not limited to) low-density parity-check (LDPC) codes and convolutional codes. At 203 it is determined if decoding was successful. For example, an error correction decoder may have a detection criterion, and it is determined at 203 if that criterion is satisfied.

If decoding is not successful, it is declared to be uncorrected, and a retry is performed at 206. The data and redundant information are (again) obtained from the expected position in storage at 200. If decoding is successful, it is determined if the decoded position matches the expected position at 204. In various embodiments, hard/soft expected or decoded positions are used at 204.

If the decoded position does not match the expected position, then it is uncorrected, and a retry occurs at 206. The data and redundant information are (again) obtained from the expected position in storage at 200. If the decoded position matches the expected position, then it is declared to be corrected, and the decoded data is output at 208. Some examples of these two scenarios are described in further detail below.

It is determined at 210 if there is more data. If so, the next data and redundant information are obtained from an expected position in storage at 200.

In some embodiments, error correction decoding (e.g., at 202) receives hard position information as well as soft information. For example, some error correction decoders are configured to input a binary (i.e., hard) value of an LBA block, and a reliability or log likelihood is assigned to each LBA bit. In other words, error correction decoding at 202 is not necessarily limited to just data, redundant information, and soft position information. Some other examples of additional information that may be processed are described in further detail below.

Although this example shows the data and redundant information are obtained at 200 from storage, this technique can be applied for any channel. In one example, data and redundant information are received via a wireless channel.

FIG. 3 is a diagram showing an embodiment of adjacent sectors in storage. In the example shown, data A (300) is the desired data, and data B (302) is adjacent to the desired data. In some embodiments, the data shown are sectors in disk storage. In some embodiments, data is stored in multiple dimensions. For example, data 300 and 302 may be located on the same track, and there are tracks (not shown) adjacent to or otherwise nearby the track on which data 300 and 302 are stored.

Figure 4:
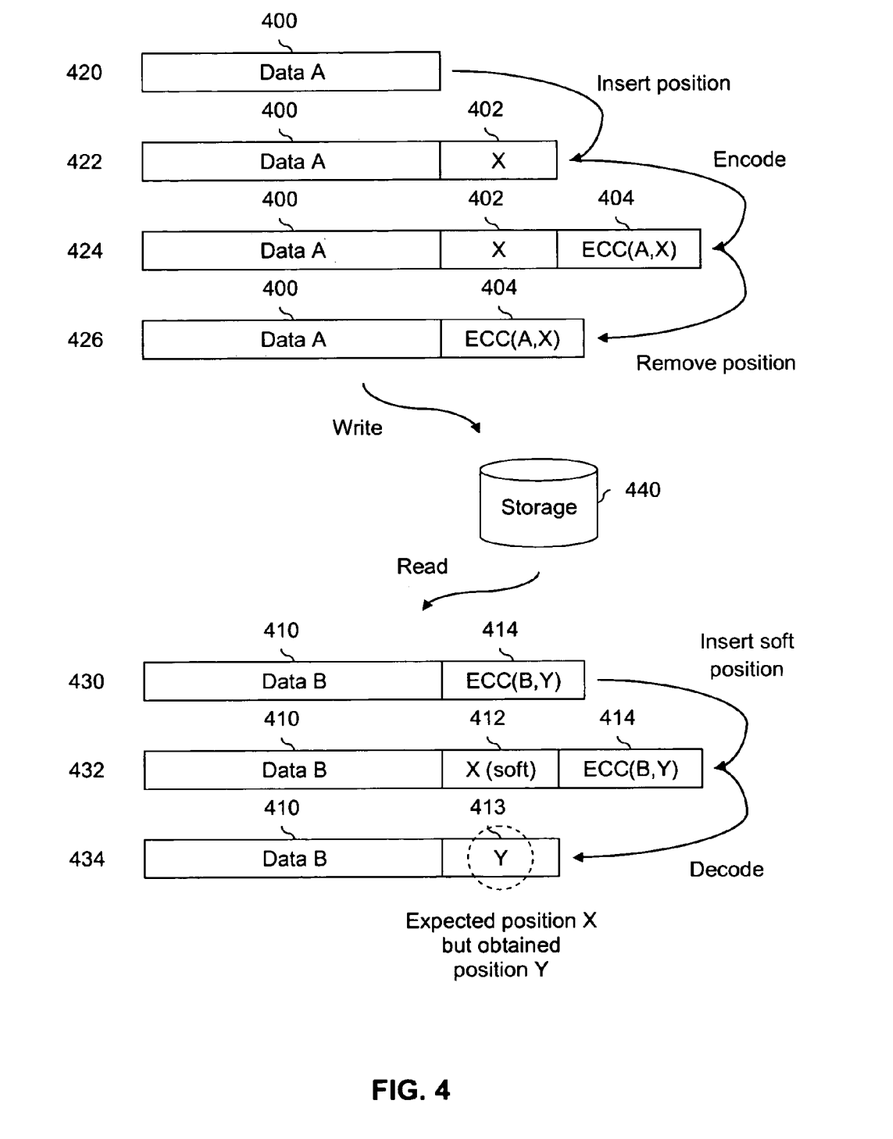
FIG. 4 is a diagram showing an embodiment of data being written to and read from storage.

FIG. 4 is a diagram showing an embodiment of data being written to and read from storage. In the example shown, the example write process of FIG. 1, the read process embodiment of FIG. 2, and the data of FIG. 3 are incorporated. This figure shows the case where information from an adjacent sector (or, more generally, information from some other position) is returned, and how the techniques described herein reduce the likelihood of miscorrection.

At 420, data A (400) is obtained. The position of data A (i.e., position X (402)) is obtained and appended to data A at 422. At 424, error correction encoding is performed on data A (400) and the position X (402) to obtain redundant information 404 (shown as ECC(A,X)). In this example, the error correction encoding is a systematic code such that the original data (i.e., prior to encoding) remains in the output and the redundant information is appended to the end. In various embodiments, error correction encoding does not necessarily have to include a systematic code, nor does a systematic code (if used) need to have the form shown (i.e., redundant information appended to the end). At 426, the position information is removed, and data A (400) and redundant information (404) are written to storage 440.

At 430, data A at position X is desired, but the system returns data B (410) and corresponding redundant information (i.e., ECC(B,Y)) 414 instead. For example, a read controller may be "off", resulting in an adjacent sector to be returned. The system is unaware at this point that the wrong information has been returned.

At 432, the soft, expected position is inserted. In this example since the system is expecting data A which corresponds to position X, a soft value of X is inserted (412). Error correction decoding is performed on data B (410), the soft position X (412), and the redundant information ECC(B,Y) 414. After decoding, the decoder corrects soft position X (412) to be position Y (413) at 434. The decoded position Y (413) in various embodiments is a hard/soft value. The obtained position Y 413 is compared to the expected position (i.e., X) and does not match, thus preventing a miscorrection.

The techniques disclosed herein are also applicable to other scenarios. For example, data may be read back from the proper sector or location, but the signal may contain so much noise that the signal plus noise is closer to another codeword. In such cases, the decoder outputs data that is not the correct or desired data but that passes decoding. This is another example of a miscorrection, and the techniques disclosed herein can be applied to that scenario as well. Similarly, the read processing techniques described herein are not necessarily limited to the write processes shown in FIG. 1 and in the top half of FIG. 5.

In some embodiments, a weight (e.g., $0<\alpha<1$) is used to obtain or otherwise generate soft position information (e.g., obtained at step 201 in FIG. 2 or inserted as 412 at 432 in FIG. 4). The following figure shows some examples of various weights that can be used.

Figure 5A:
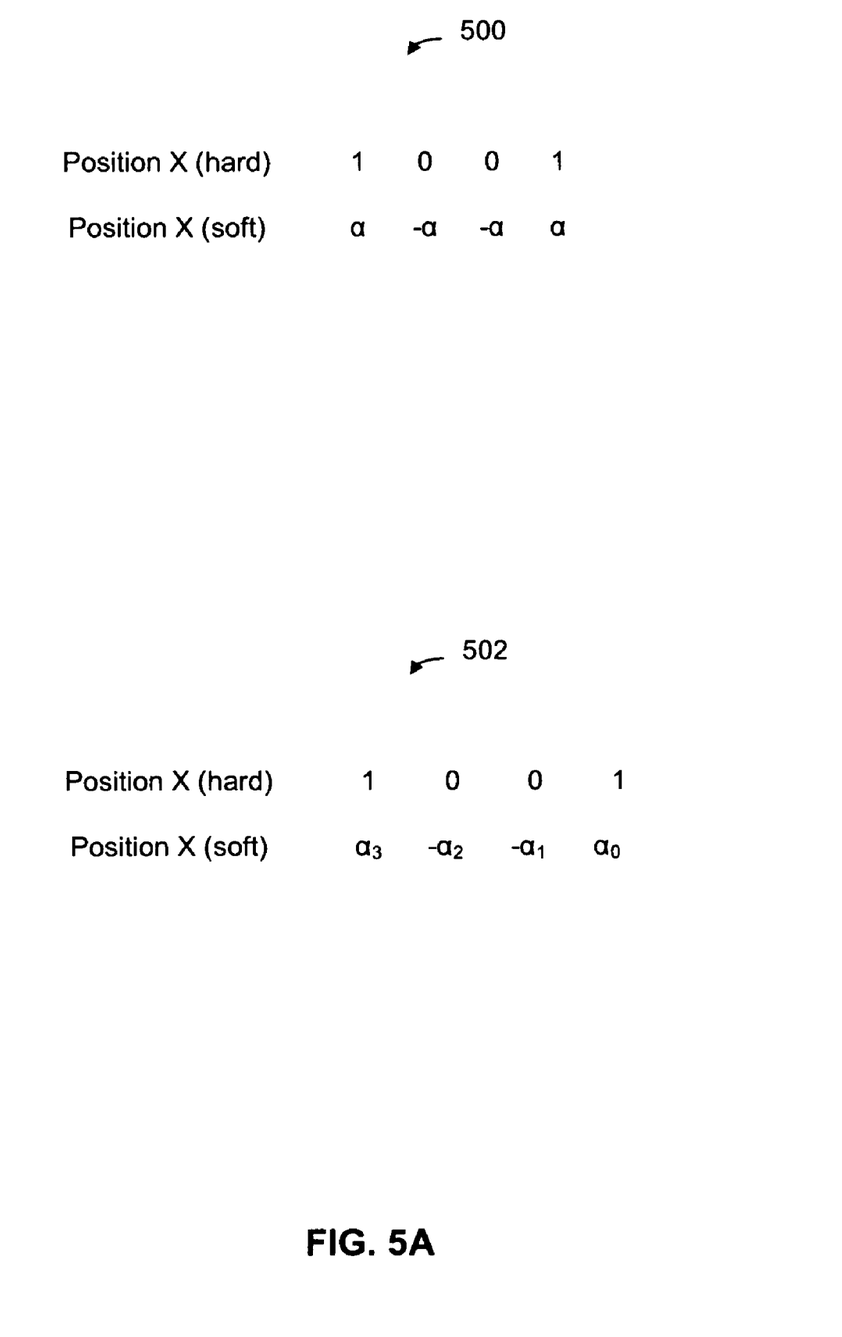
FIG. 5A shows some embodiments of one or more weights used to obtain soft position information.

FIG. 5A shows some embodiments of one or more weights used to obtain soft position information. In the example shown, the position contains four bits. In some embodiments, the position information shown (and used by a system) is a portion of an address or offset at which the data is stored. For example, the four least significant bits of an LBA may be used (e.g., during read processing, some examples of which are shown in FIGS. 2 and 4). In some other embodiments, some other number of bits (i.e., besides four) are used.

In diagram 500, one weight ($\alpha$) is used for all bits in a position. For example, both the most significant bit and the least significant bit use the same $\alpha$. In contrast, each bit in diagram 502 uses different weights which can be set to the same or different values. For example, the most significant bit corresponds to a weight of $\alpha_3$, while the least significant bit corresponds to a weight of $\alpha_0$. The weights $\alpha$, $\alpha_3$, ..., $\alpha_o$ shown in diagrams 500 and 502 are all strictly greater than 0 and strictly less than 1.

In diagrams 500 and 502, if a bit in hard position X is a 1, then the positive value of the corresponding weight (e.g., $\alpha$ or $\alpha_3$ or ... or $\alpha_0$) is used. If the bit is a 0, then the negative value of the corresponding weight is used.

In some embodiments, the weight(s) are stored in one or more registers, and the value(s) of the weight(s) are programmable. In some embodiments, the value of a weight changes over time. Some examples of this are described in further detail below.

Figure 5B:
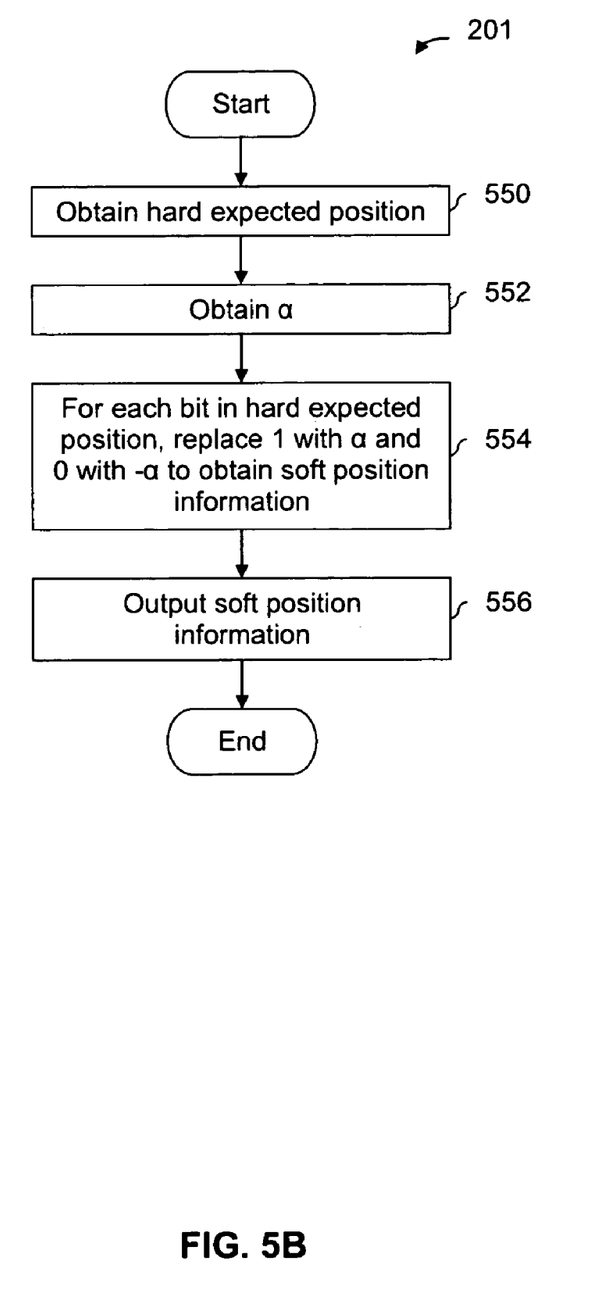
FIG. 5B is a flowchart illustrating an embodiment of a process to obtain soft position information.

FIG. 5B is a flowchart illustrating an embodiment of a process to obtain soft position information. In the example shown, the process corresponds to the example of diagram 500 in FIG. 5A. In some embodiments, the step of obtaining soft position information at 201 is performed as shown. In some other embodiments, some other process is used.

At 550, a hard expected position is obtained. For example, in FIG. 3, the desired or requested data is at position X, so the hard representation of position X is obtained. In diagram 500 of FIG. 5A this value is 1001. At 552 $\alpha$ is obtained. In some embodiments, $\alpha$ is obtained from a register. In some embodiments, $\alpha$ is "swept" (e.g., from low to high or vice versa), e.g., a previous value of $\alpha$ is obtained and incremented/decremented.

Each 1 and 0 in the hard expected position is replaced with $\alpha$ and $-\alpha$, respectively, to obtain soft position information at 554. For example, in diagram 500 in FIG. 5A, each of the most significant bit and the least significant bit is 1 and is replaced with $\alpha$. Each of the middle bits in the hard representation is 0 and is replaced with $-\alpha$. The soft position information is output at 556.

Figure 6:
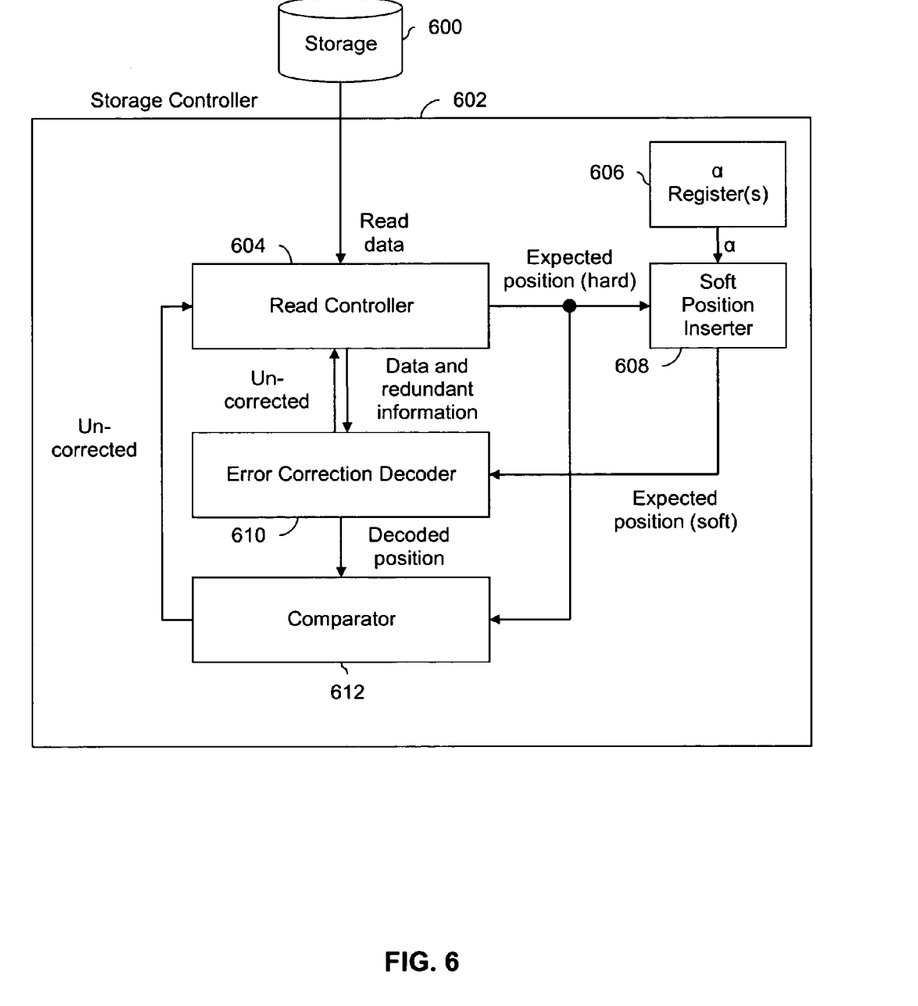
FIG. 6 is a system diagram showing an embodiment of a storage controller that performs decoding using soft position information.

FIG. 6 is a system diagram showing an embodiment of a storage controller that performs decoding using soft position information. In the example shown, storage controller 602 performs the read processing shown in FIG. 2. Although not shown, storage controller 602 performs other processes, such as the write processing shown in FIG. 1. For clarity, only components associated with read processing are shown.

Read data is passed from storage 600 to read controller 604. For example, an application or user may request data A (300) at position X as shown in FIG. 3. Read controller 604 passes the data and redundant information to error correction decoder 610. For example, in FIG. 4, data 410 and redundant information 414 may be exchanged. A hard expected position is passed from read controller 604 to soft position inserter 608. Continuing the above example, if position X is at 1001 then that hard value is passed to soft position inserter 608.

Soft position inserter obtains one or more weights ($\alpha$) from $\alpha$ register(s) 606, and a soft expected position is passed to error correction decoder 610 based on the hard expected position and the one or more weights. Referring back to FIG. 4, soft X 412 is one example of the information exchanged.

Error correction decoder 610 uses the data and redundant information from read controller 604 and the soft expected position from soft position inserter 608 to perform error correction processing. For example, in FIG. 4, this is shown as the transition from 432 to 434. Error correction decoder 610 passes a decoded position to comparator 612.

Comparator 612 compares this decoded position to a hard expected position received from read controller 604. If they do not match, an uncorrected signal is passed to read controller 604, and the process repeats. In some embodiments, the same value of a is used in this subsequent or repeated process. In some other embodiments, a is increased. If comparator 612 determines that the decoded position and the expected position match, then the decoded data is output (not shown).

Figure 7:
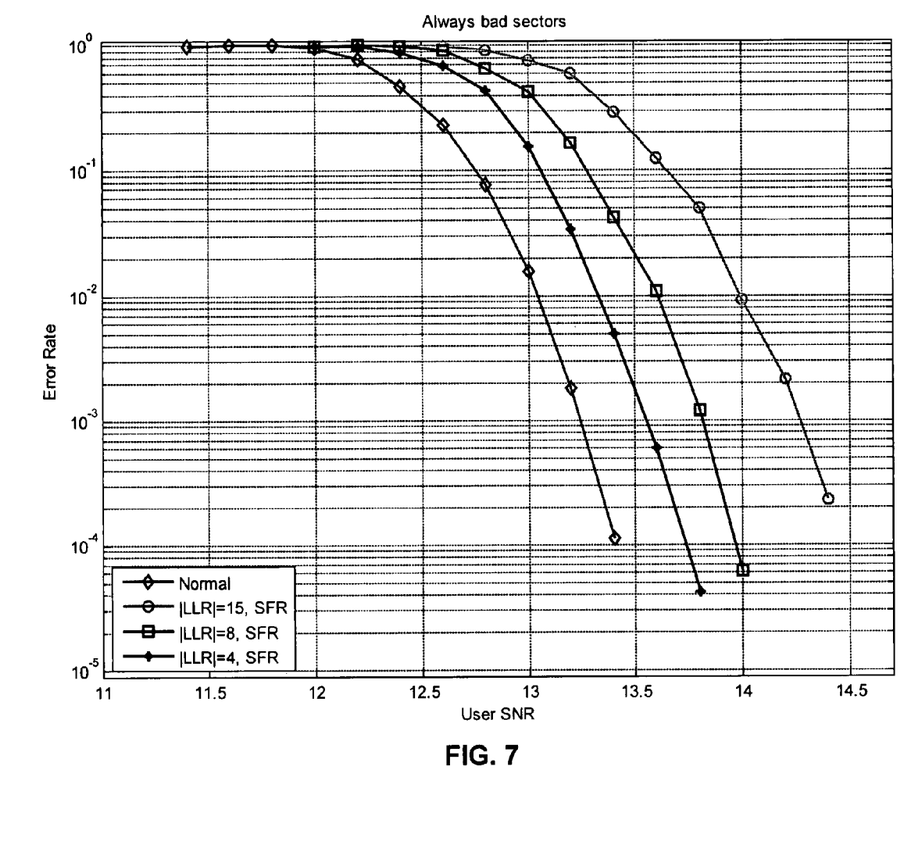
FIG. 7 is a diagram showing example error rates using the technique described above for bad sectors.

FIG. 7 is a diagram showing example error rates using the technique described above for bad sectors. In the example shown, incorrect sectors are returned. The graph shows error rate as a function of SNR for three log likelihood ratios. In the example shown, "normal" corresponds to no position information being used in the encoder/decoder. As shown in FIG. 7, for this scenario (i.e., where an incorrect sector or location is returned) the error rate decreases as the value of a decreases (i.e., as a approaches 0).

Figure 8:
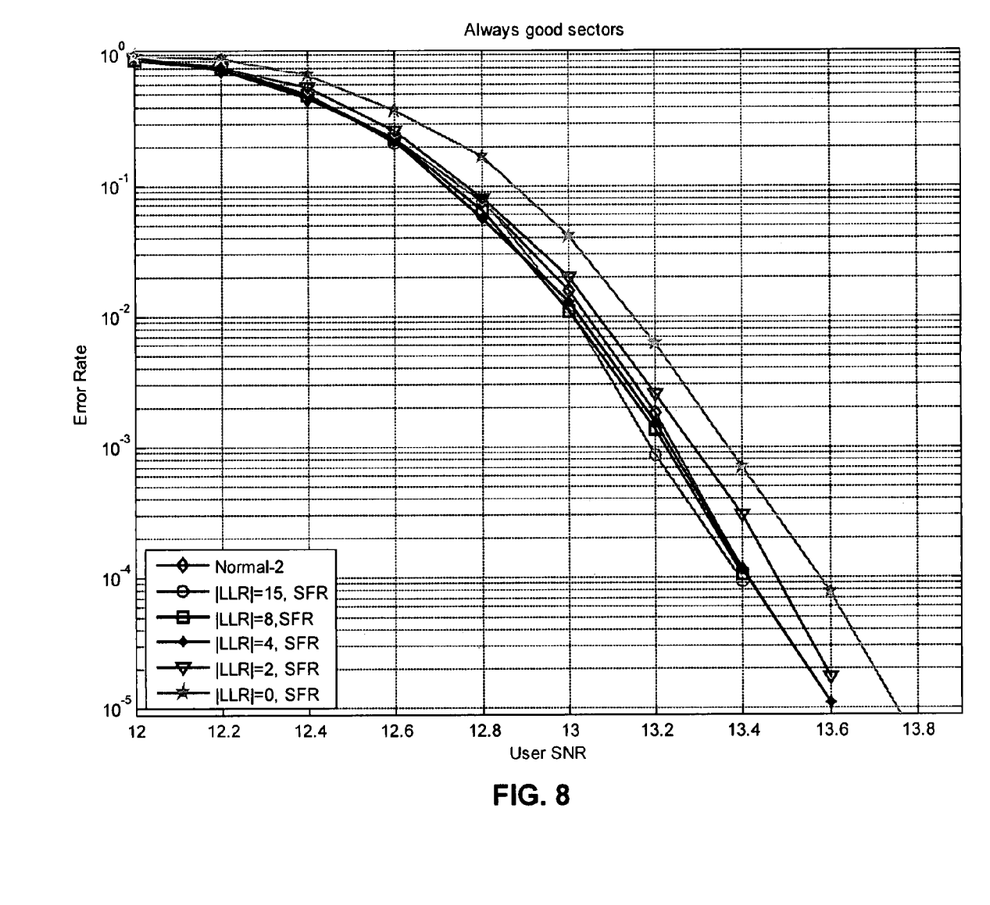
FIG. 8 is a diagram showing example error rates using the technique described above for good sectors.

FIG. 8 is a diagram showing example error rates using the technique described above for good sectors. In this example, correct sectors are returned. Performance improves slightly as the value of a increases (i.e., as a approaches 1). Compared to the graph of FIG. 7, the performance is more tightly clustered. That is, the error rate does not change as much as in FIG. 7 as the value of a changes.

Using the information shown in FIGS. 7 and 8, the value of one or more weights (e.g., a) can be modified dynamically. The following figure shows one example.

Figure 9:
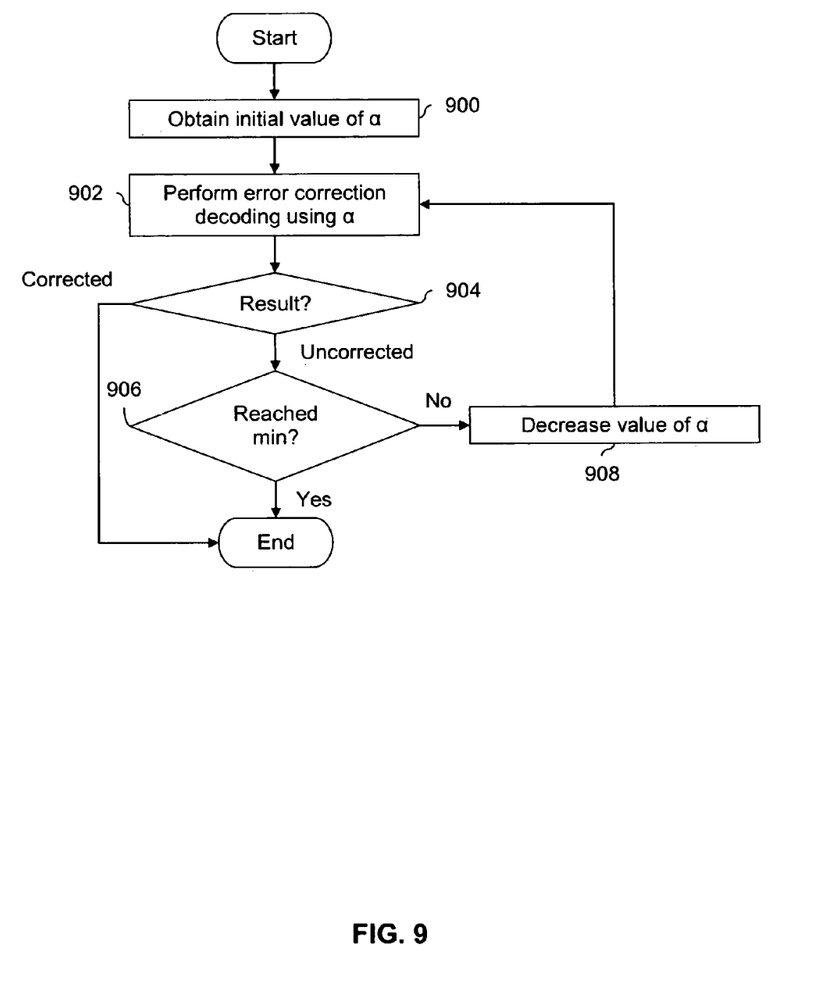
FIG. 9 is a flowchart illustrating an embodiment of a process for dynamically modifying a weight used to obtain soft position information.

FIG. 9 is a flowchart illustrating an embodiment of a process for dynamically modifying a weight used to obtain soft position information. In some embodiments, there is more than one weight, and the example process shown is modified accordingly.

At 900, an initial value of $\alpha$ is obtained. Error correction decoding is performed using $\alpha$ at 902. It is determined at 904 what the result is. If error correction decoding resulted in a corrected result, the process ends. Otherwise, if it is uncorrected, it is determined at 906 if $\alpha$ has reached a minimum. If not, the value of $\alpha$ is decreased at 908. In various embodiments, $\alpha$ is decreased linearly, exponentially, etc.

In some embodiments, a similar process is used to increment the value of $\alpha$. For example, as the number of consecutive, successfully decoded sectors increases, the value of $\alpha$ increases and approaches 1.

Figure 10:
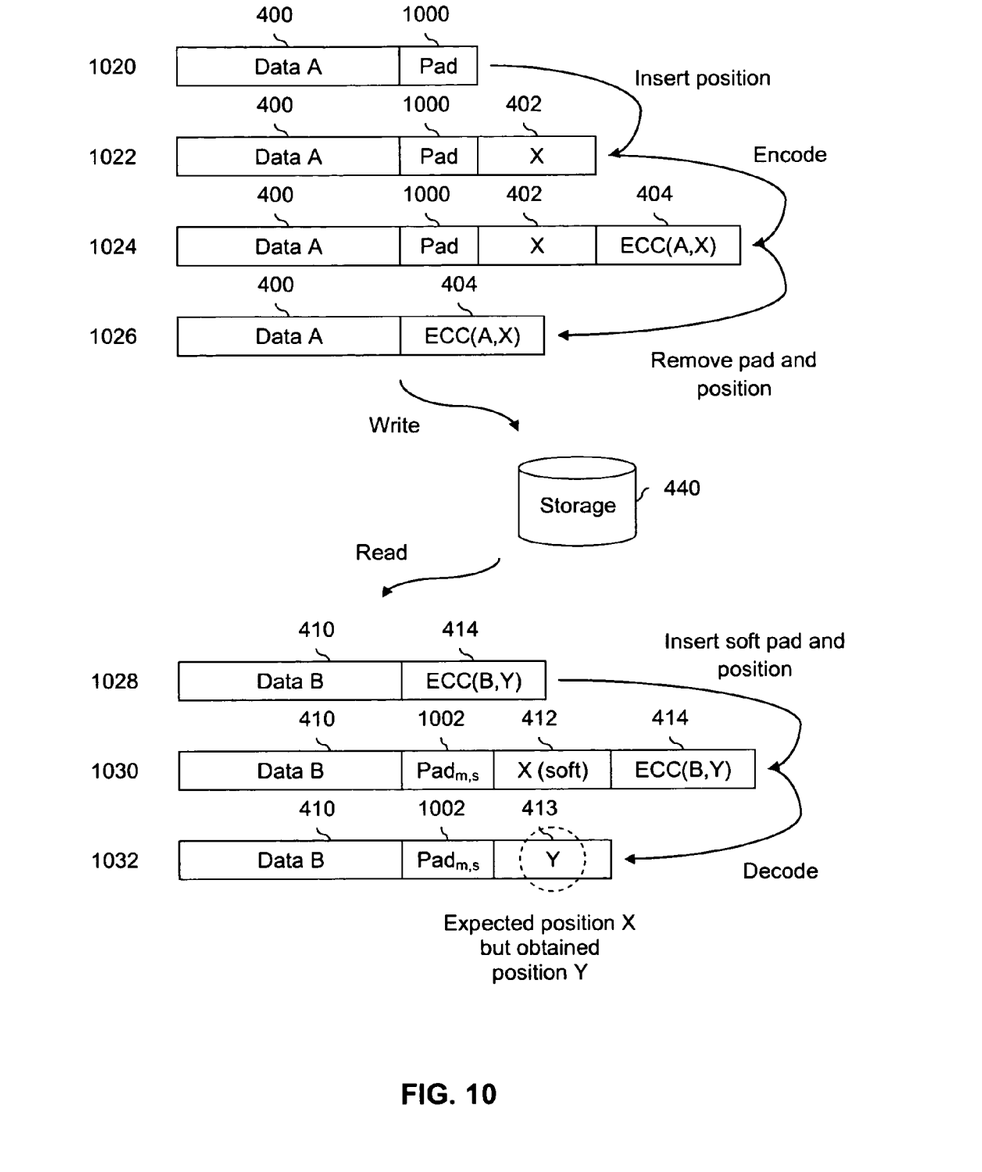
FIG. 10 shows data (including a pad) being written to and read from storage.

FIG. 10 shows data (including a pad) being written to and read from storage. In the example shown, the data is similar to that shown in FIG. 4, and corresponding pieces of information have the same reference numbers. In this example, the data includes pad 1000 during write processing. The error correction encoding performed between 1022 and 1024 uses this pad information, but prior to writing to storage at 1026 the pad is removed (e.g., since it is overhead information and would reduce the effective storage capacity of storage 440). At least in this example, the system uses the same pad, regardless of the data being operated on (e.g., data A 400) or the location to which the data is stored in storage 440.

During read processing, pad 1002 is inserted between points 1028 and 1030. The pad 1002 which is inserted in this example is a soft value but has the highest value or likelihood. Since in this example system the same pad is used for all data and/or or all locations in storage, the soft information associated with the pad is set to the highest value of likelihood to enable an error correction decoder to have better performance.

In some embodiments, pad information is included when an error correction encoding has a smaller amount of data than is required for encoding. In such cases, extra dummy bits are added to satisfy this length constraint. In some embodiments, pad information is included when hardware design needs to meet certain data path width requirement.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing data, comprising:
    obtaining data and redundant information from an expected position in a channel;
    obtaining soft position information associated with the data;
    using a processor to perform error correction decoding using the data, the redundant information, and the soft position information to obtain a decoded position and decoded data;
    determining if the decoded position matches the expected position; and
    outputting the decoded data in the event the decoded position matches the expected position.

2. The method of claim 1, wherein the soft position information includes at least some portion of one of the following: an offset, a logical block address (LBA), a track number, a sector number, or information from two or more dimensions.

3. The method of claim 1, wherein the channel includes a storage device.

4. The method of claim 1 further comprising obtaining soft pad information associated with the data, wherein the soft pad information is set to a highest likelihood.

5. The method of claim 1, wherein performing error correction decoding includes decoding a low-density parity-check (LDPC) code or a convolutional code.

6. The method of claim 1 further comprising repeating at least the steps of obtaining the data and the redundant information, performing error correction decoding, and determining in the event the decoded position does not match the expected position.

7. The method of claim 6, wherein:
    obtaining the soft position information includes obtaining a weight a where $0<\alpha<1$; and
    the method further includes decreasing the value of $\alpha$ in the event the decoded position does not match the expected position, wherein the repeated step of performing error correction decoding includes using the decreased value of $\alpha$.

8. The method of claim 1 further comprising repeating at least the steps of obtaining the data and the redundant information, performing error correction decoding, and determining in the event error correction decoding is unsuccessful.

9. The method of claim 8, wherein:
    obtaining the soft position information includes obtaining a weight $\alpha$ where $0<\alpha<1$; and
    the method further includes decreasing the value of $\alpha$ in the event the decoded position does not match the expected position, wherein the repeated step of performing error correction decoding includes using the decreased value of $\alpha$.

10. The method of claim 1, wherein obtaining the soft position information includes obtaining a weight $\alpha$ where $0<\alpha<1$.

11. The method of claim 10, wherein the soft position information includes a plurality of bits and there is a weight $\alpha$ corresponding to each bit.

12. A system for processing data, comprising:
    an interface configured to:
        obtain data and redundant information from an expected position in a channel; and
        obtain soft position information associated with the data; and
    a processor configured to:
        perform error correction decoding using the data, the redundant information, and the soft position information to obtain a decoded position and decoded data; and
        determine if the decoded position matches the expected position, wherein the interface is further configured to output the decoded data in the event the decoded position matches the expected position.

13. The system of claim 12, wherein the processor is further configured to repeat at least the steps of obtaining the data and the redundant information, performing error correction decoding, and determining in the event the decoded position does not match the expected position.

14. The system of claim 12, wherein the processor is further configured to repeat at least the steps of obtaining the data and the redundant information, performing error correction decoding, and determining in the event error correction decoding is unsuccessful.

15. The system of claim 12, wherein obtaining the soft position information includes obtaining a weight $\alpha$ where $0<\alpha<1$.

16. A computer program product for processing data, the computer program product being embodied in a non-transitory computer readable storage medium and comprising computer instructions for:
    obtaining data and redundant information from an expected position in a channel;
    obtaining soft position information associated with the data;
    performing error correction decoding using the data, the redundant information, and the soft position information to obtain a decoded position and decoded data;
    determining if the decoded position matches the expected position; and
    outputting the decoded data in the event the decoded position matches the expected position.

17. The computer program product of claim 16 further comprising computer instructions for repeating at least the steps of obtaining the data and the redundant information, performing error correction decoding, and determining in the event the decoded position does not match the expected position.

18. The computer program product of claim 16 further comprising computer instructions for repeating at least the steps of obtaining the data and the redundant information, performing error correction decoding, and determining in the event error correction decoding is unsuccessful.

19. The computer program product of claim 16, wherein the computer instructions for obtaining the soft position information include computer instructions for obtaining a weight $\alpha$ where $0<\alpha<1$.

* * * * *

UNITED STATES PATENT AND TRADEMARK OFFICE
CERTIFICATE OF CORRECTION

| | | |
|---|---|---|
| PATENT NO. | : 8,281,224 B1 | Page 1 of 1 |
| APPLICATION NO. | : 12/460897 | |
| DATED | : October 2, 2012 | |
| INVENTOR(S) | : Kou et al. | |

It is certified that error appears in the above-identified patent and that said Letters Patent is hereby corrected as shown below:

In the Claims

Column 7, Line 48:
delete "a" after weight

- and -

Column 7, Line 48:
insert -- α -- after weight

Signed and Sealed this
Twenty-seventh Day of May, 2014

Michelle K. Lee
*Deputy Director of the United States Patent and Trademark Office*